United States Patent
Nobuyasu et al.

(10) Patent No.: US 6,445,683 B1
(45) Date of Patent: Sep. 3, 2002

(54) HOST SYSTEM FOR BASE STATION

(75) Inventors: Kosuke Nobuyasu; Tatsuru Nakagaki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/082,360

(22) Filed: May 20, 1998

(30) Foreign Application Priority Data

Nov. 7, 1997 (JP) .............................................. 9-305328

(51) Int. Cl.$^7$ .......................... H04L 12/28; H04Q 7/00; H04J 3/24; H04J 3/22
(52) U.S. Cl. .................. 370/310.1; 370/328; 370/395.6
(58) Field of Search ................................ 370/395–399, 370/468, 310.11, 310.2, 313, 320, 335, 338, 342, 349, 392, 395.1, 395.6, 395.63, 395.65, 393, 473, 474, 328

(56) References Cited

U.S. PATENT DOCUMENTS

| | | | |
|---|---|---|---|
| 5,802,051 A | * | 9/1998 | Petersen et al. ............. 370/473 |
| 5,878,045 A | * | 3/1999 | Timbs ......................... 370/328 |
| 5,930,265 A | * | 7/1999 | Duault et al. ............... 370/473 |
| 5,953,339 A | * | 9/1999 | Baldwin et al. ............. 370/397 |
| 6,009,096 A | * | 12/1999 | Jaisingh et al. .......... 370/310.1 |
| 6,021,135 A | * | 2/2000 | Ishihara et al. ............. 370/474 |
| 6,151,318 A | * | 11/2000 | Woodward et al. ......... 370/474 |

OTHER PUBLICATIONS

Boldt et al, Modeling an ATM based Access network for 3rd generation mobile communication networks, 4/98, IEEE, pp. 2590–2593.*
Xiaoyu et al, QoS Simulation AAL2 in CDMA/ATM based Mobile systems, 9/00, IEEE, pp. 884–887.*

* cited by examiner

*Primary Examiner*—Chau Nguyen
*Assistant Examiner*—Chiho A. Lee
(74) *Attorney, Agent, or Firm*—Katten Muchin Zavis Rosenman

(57) ABSTRACT

A base-station host system achieves high-speed routing to reduce a burden on a controller which carries out a routing process, and receives a cell containing a plurality of packets (an ATM cell of AAL Type 2) from a base station. A cell containing a plurality of packets is transmitted from the base station to the base-station host system. A packet extracting unit extracts the packets from the received cell. A cell generating unit generates an internally processable cell based on information carried by the payload of a packet. A switch unit switches internally processable cells depending on routes thereof. For reverse communications, internally processable cells are sent from the switch unit to a packet generating unit. The packet generating unit generates packets based on information carried by the payloads of the internally processable cells. A cell transmitting unit collects a plurality of packets designed for the same base station, generates a cell containing those packets, and transmits the generated cell to the base station.

6 Claims, 11 Drawing Sheets

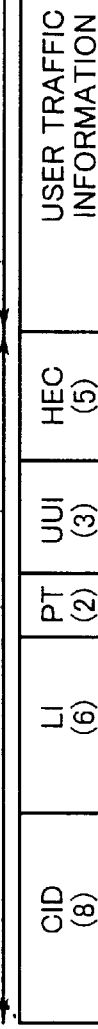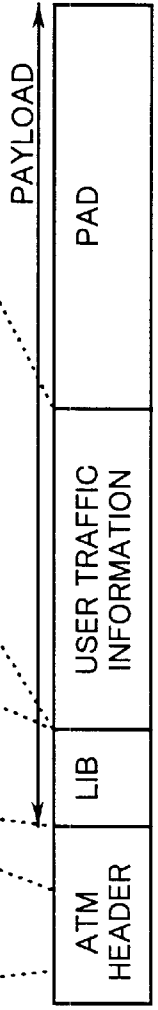
FIG. 4(A) AAL-TYPE 2 ATM CELL
FIG. 4(B) CPS PACKET
FIG. 4(C) AAL-TYPE 0 ATM CELL

FIG. 10(A) AAL-TYPE 2 ATM CELL

FIG. 10(B) CPS PACKET

FIG. 10(C) AAL-TYPE 0 ATM CELL

HOST SYSTEM FOR BASE STATION

BACKGROUND OF THE INVENTION (1) Field of the Invention

The present invention relates to a host system for a base station, and more particularly to a basestation host system for receiving ATM (Asynchronous Transfer Mode) cells of AAL (ATM Adaptation Layer) Type 2 from a base station.

(2) Description of the Related Art

Since ATM networks transfer all information as cells, layers (up to the ATM layer) involved in the transfer of cells do not process voice data, video data, and other data in consideration of media and services. Service qualities (delay times, error rates, etc.) required for respective services are different from each other. Therefore, for converting original information for the services into cells, it is necessary to absorb the difference between such different service qualities. ATM adaptation layers (AALs) are employed to meet such a requirement.

There are different types of ATM adaptation layers that are classified according to function. Recently, AAL Type 2 has been standardized. Efforts have been made to standardize AAL Type 2 for transferring voice data that have been compressed to less than 64Kbps. AAL Type 2 has been developed under the concept of multiplexing CPS (Common Part Sublayer) packets of plural users having short variable-length payloads into ATM cells.

AAL Type 2 serves to meet the strong demand in the market for applying the ATM technology to communications between radio base stations and switching offices of cellular mobile communication systems.

Inasmuch as the standardization of ATM communications of AAL Type 2 has just been completed, there has heretofore been available no system based on AAL Type 2.

FIG. 11 of the accompanying drawings shows in block form a mobile communication system to which ATM communications of AAL Type 2 are applied. As shown in FIG. 11, the mobile communication system has a plurality of base transceiver stations (BTS) 101–103 and a base station controller (BSC) 104. ATM communications of AAL Type 2 are applied to the transmission over entrance links between the base transceiver stations 101–103 and the base station controller 104. In the base station controller 104, CPS packets contained in ATM cells of AAL Type 2 are extracted, and routed using a packet switch (P-SW) 104a.

The packet switch 104a buffers each packet, reads its address, and effects switching depending on the address. Such activities of the packet switch 104a are software-implemented. However, the software-based packet routing is slow and tends to put a large burden on the base station controller 104 which controls the packet switch 104a.

For transmitting order wire service information, it is necessary to install separate dedicated lines between base transceiver stations 101–103 and the base station controller 104. However, since installing such separate dedicated lines entails an additional expenditure of expenses, there is a demand for an improved scheme for transmitting order wire service information without separate dedicated lines.

SUMMARY OF THE INVENTION

It is an object of the present invention to provide a base-station host system for achieving high-speed routing for ATM communications of AAL Type 2 to reduce a burden on a controller which carries out a routing process.

Another object of the present invention is to provide a base-station host system which is capable of transmitting order wire service information without separate dedicated lines.

To accomplish the above objects, there is provided a host system for controlling a base station to transmit a signal to and receive a signal from the base station by way of a cell containing a plurality of packets representing signals from the base station to a plurality of base station or from a plurality of base station to the base station, comprising packet extracting means for extracting a plurality of individual packets contained in a cell, cell generating means for generating an internally processable cell based on the individual packets extracted by the packet extracting means, switching means for switching internally processable cells generated by the cell generating means depending on routes thereof, packet generating means for generating packets based on an internally processable cell destined for a base station, and cell transmitting means for generating a cell containing a plurality of packets designed to the same base station from the packets which are generated by the packet generating means and transmitting the generated cell to the base station.

To accomplish the above objects, there is also provided a host system for controlling a plurality of base stations in a mobile communication system, comprising receiving means for receiving a cell carrying order wire service information from a base station, and transmitting means for adding order wire service information to a cell and transmitting the cell to a base station.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4(A) is a diagram showing the structure of an ATM cell of AAL Type 2;

FIG. 4(B) is a diagram showing the structure of a CPS packet;

FIG. 4(C) is a diagram showing the structure of an ATM cell of AAL Type 0;

DESCRIPTION OF THE PREFERRED EMBODIMENTS

Figure 1:
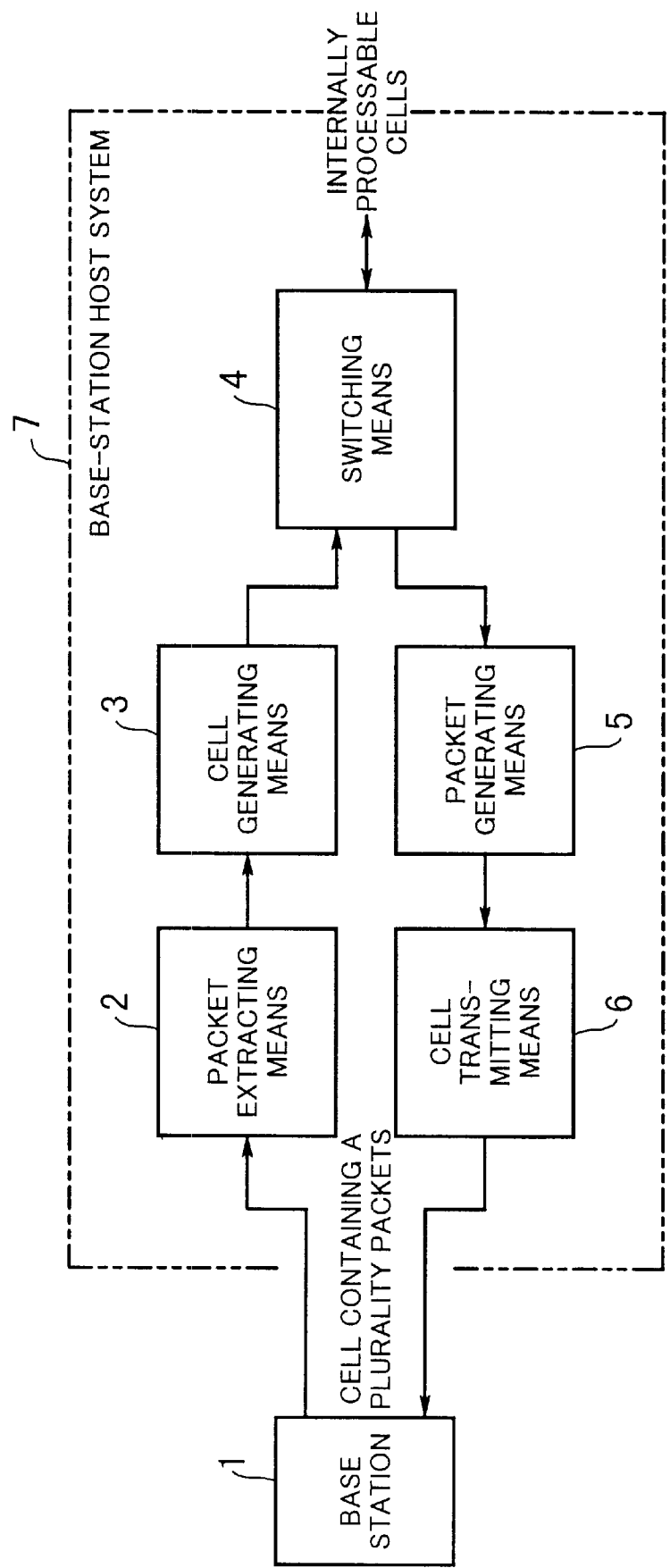
FIG. 1 is a block diagram illustrating the principles of the present invention.

The principles of the present invention will first be described below with reference to FIG. 1. As shown in FIG. 1, a base-station host system 7 according to the present invention comprises a packet extracting means 2 for extracting a plurality of individual packets contained in a cell, a cell generating means 3 for generating an internally processable cell based on the individual packets extracted by the packet extracting means 2, a switching means 4 for switching internally processable cells generated by the cell generating means 3 depending on their routes, a packet generating means 5 for generating packets based on an internally processable cell destined for a base station 1, and a cell transmitting means 6 for generating a cell containing a plurality of packets destined to the same base station from the packets which are generated by the packet generating means 5 and transmitting the generated cell to the base station.

The payload of each of the packets extracted by the packet extracting means 2 carries at least user traffic information, and the payload of an internally processable cell based on which packets are generated by the packet generating means 5 also carries at least user traffic information.

The base-station host system shown in FIG. 1 operates as follows: A cell containing a plurality of packets is transmitted from the base station 1 to the base-station host system 7. The packet extracting means 2 extracts a plurality of packets contained in the cell which is received.

Since the payload of each of the extracted packets carries user traffic information, the cell generating means 3 generates an internally processable cell based on the information carried by the payload of one packet. The generated internally processable cell can be routed by the switching means 4 because it is destined for a single user.

Internally processable cells generated by the cell generating means 3 are sent to the switching means 4, which switches the internally processable cells depending on their routes. Generally, the switching means 4 first effects a software-depending process for setting up routes in a routing table (present in a register) and subsequently effects a hardware-depending process for routing cells. Therefore, the switching means 4 has a high routing rate and suffers a relatively low burden for routing control.

For reverse communications from the base-station host system 7 to the base station 1, an internally processable cell is transmitted from the switching means 4 to the packet generating means 5. The internally processable cell carries at least the user traffic information set from a single user. The packet generating means 5 generates packets based on the information carried by the payload of the internally processable cell. The cell transmitting means 6 collects packets destined for the same base station from those packets which are generated by the packet generating means 5, generates a cell containing the collected packets, and transmits the generated cell to the base station 1.

Therefore, high-speed routing can be accomplished and a burden on a controller for routing cells can be reduced for ATM communications.

The payload of each of the packets extracted by the packet extracting means 2 carries order wire service information, and the payload of an internally processable cell based on which packets are generated by the packet generating means 5 also carries order wire service information.

Consequently, order wire service information can be transmitted without the installation of separate dedicated lines.

The host system for controlling a base station and the host system for controlling a plurality of base stations specifically represent a base station controller (BSC) or a mobile switching center (MSC) having basestation controlling functions, respectively.

A base-station host system according to a first embodiment of the present invention will be described below. According to the first embodiment, a cell containing a plurality of packets, as referred to above, corresponds to an ATM cell of AAL Type 2, and an internally processable cell, as referred to above, corresponds to an ATM cell of AAL Type 0.

Figure 2:
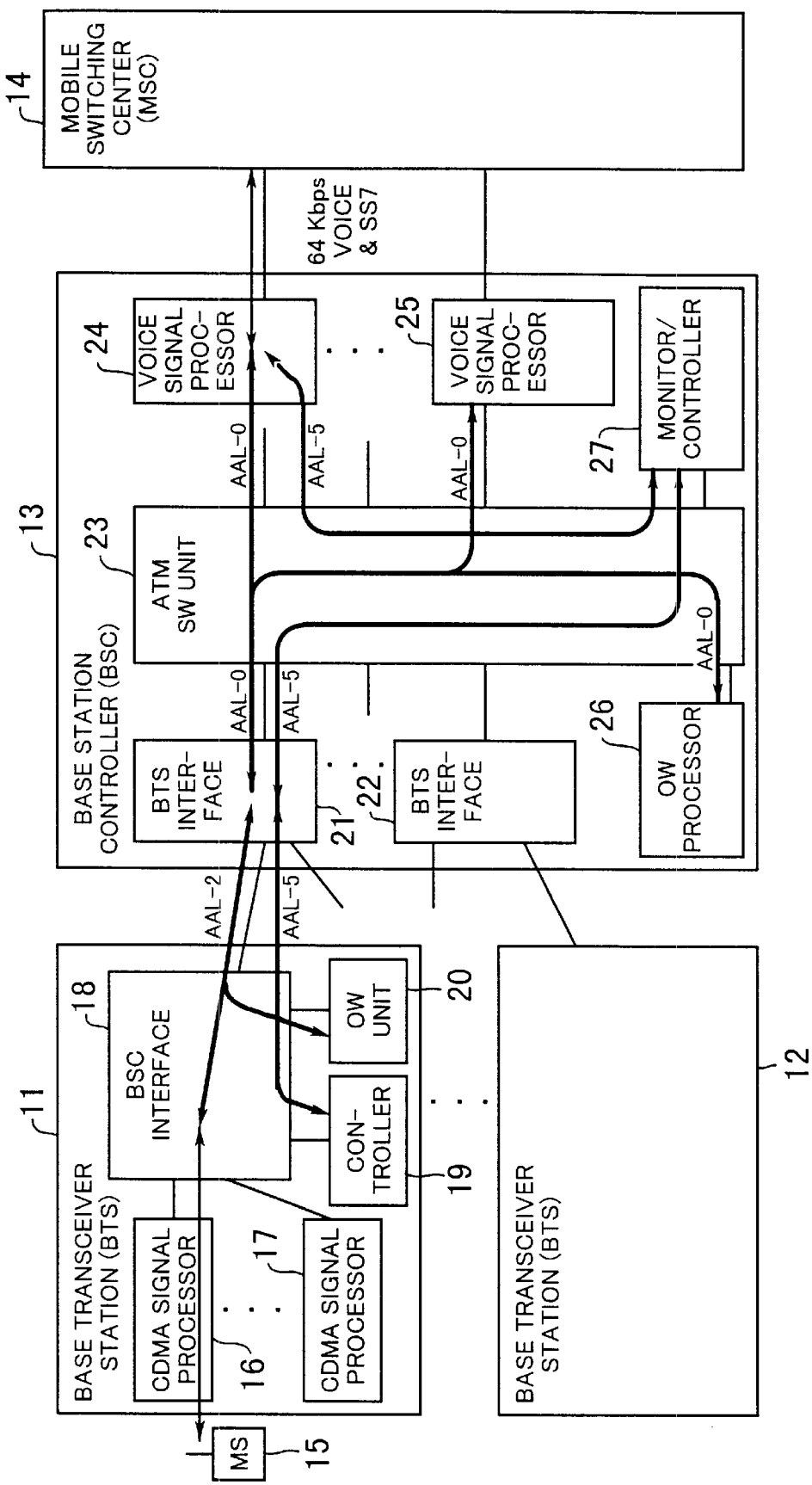
FIG. 2 is a block diagram of a communication system which incorporates a base-station host system according to a first embodiment of the present invention.

FIG. 2 shows in block form a communication system which incorporates the base-station host system according to the first embodiment of the present invention. As shown in FIG. 2, the communication system basically comprises a plurality of base transceiver stations (BTS) 11, 12, a base station controller (BSC) 13, a mobile switching center (MSC) 14, and a mobile station (MS) 15. Actually, the communication system has about 150 base transceiver stations 11, 12, which are connected to the single base station controller 13. While only one mobile station (MS) 15 is shown in FIG. 2, the communication system has many mobile stations that are connected to the base transceiver stations 11, 12 by radio links.

User traffic information, signaling information, order wire service information, and BTS monitoring control information are transmitted over entrance links between the base transceiver stations 11, 12 and the base station controller 13. The user traffic information and the signaling information as they are put together by CDMA (Code Division Multiple Access) signal processing are transmitted by ATM cells of AAL Type 2. The order wire service information is also transmitted by ATM cells of AAL Type 2. The BTS monitoring control information is transmitted by ATM cells of AAL Type 5.

Voice signals of 64 Kbps and control signals according to the signaling system #7 (SS7) are transmitted between the base station controller 13 and the mobile switching center 14.

In FIG. 2, thinner lines interconnecting the blocks represent actual physical links, and thicker lines transmission paths for signals that flow through the physical links.

The base transceiver station 11 comprises a plurality of CDMA signal processors 16, 17, a BSC interface 18, a controller 19, and an OW unit 20. The CDMA signal processors 16, 17 processes user traffic information and signaling information according to the CDMA signal processing, and transmit the processed information to the mobile station 15. The CDMA signal processors 16, 17 also process a signal transmitted from the mobile station 15 according to the CDMA signal processing to obtain user traffic information and signaling information, and transmit the user traffic information and the signaling information together through the BSC interface 18 to the basestation host system 13. The controller 19 monitors the base transceiver station 11 and transmits monitor information BTS monitoring control information through the BSC interface 18 to the base-station host system 13. The controller 19 also controls the base transceiver station 11 according to control information which has been sent as BTS monitoring control information from the basestation host system 13. The OW unit 20 transmits order wire service information to and receives order wire service information from the base-station host system 13 through the BSC interface 18.

The BSC interface 18 adds the user traffic information and the signaling information sent from the CDMA signal processors 16, 17 to an ATM cell of AAL Type 2, and transmits the ATM cell of AAL Type 2 to the base-station host system 13. Similarly, the BSC interface 18 adds order wire service information sent from the OW unit 20 to an ATM cell of AAL Type 2, and transmits the ATM cell of AAL Type 2 to the base-station host system 13. Furthermore, the BSC interface 18 adds the BTS monitoring control information sent from the controller 19 to an ATM cell of AAL Type 5, and transmits the ATM cell of AAL Type 5 to the base-station host system 13. The BSC interface 18 also reverses the above adding and transmitting process.

The base transceiver station 12 is of the same structure and operates in the same manner as the base transceiver station 11.

The base-station host system 13 comprises a plurality of BTS interfaces 21, 22, an ATM SW (switch) unit 23, a plurality of voice signal processors 24, 25, an OW processor 26, and a monitor/controller 27. Each of the BTS interfaces 21, 22 effects a different operation depending on the type of an ATM cell transmitted from the BSC interfaces of the base transceiver stations 11, 12. Specifically, if an ATM cell of AAL Type 2 is transmitted, then each of the BTS interfaces 21, 22 converts the ATM cell of AAL Type 2 into an ATM cell of AAL Type 0, and transmits the ATM cell of AAL Type 0 to the ATM SW unit 23. The ATM SW unit 23 transmits an ATM cell which carries user traffic information and order wire service information to the voice signal processors 24, 25, and transmits an ATM cell which carries order wire service information to the OW processor 26. If an ATM cell of AAL Type 5 is transmitted, then each of the BTS interfaces 21, 22 transmits the ATM cell of AAL Type 5 as it is through the ATM SW unit 23 to the monitor/controller 27. The BTS interfaces 21, 22 and the ATM SW unit 23 also reverse the above converting and transmitting process.

An ATM cell of AAL Type 0 contains a single item of user traffic information on the payload thereof, and is routed only in an ATM layer without involving an ATM adaptation layer.

The BSC interfaces 18 of the base transceiver stations 11, 12 are connected to each of the BTS interfaces 21, 22, which effects processing operation individually with respect to each of the BSC interfaces 18.

The ATM SW unit 23 routes a received ATM cell of AAL Type 0 or AAL Type 5 based on a VPI/VCI (Virtual Path Identifier/Virtual Channel Identifier) contained in the header thereof. The ATM SW unit 23 first effects a software-depending process for setting up routes in a routing table (present in a register) and subsequently effects a hardware-depending process for routing cells. Therefore, the ATM SW unit 23 has a high routing rate and suffers a relatively low burden for routing control.

Upon reception of an ATM cell of AAL Type 0, each of the voice signal processors 24, 25 separates the signaling information from user traffic and signaling information carried by the payload of the received ATM cell, adds the separated signaling information to an ATM cell of AAL Type 5, and transmits the ATM cell of AAL Type 5 through the ATM SW unit 23 to the monitor/controller 27. Each of the voice signal processors 24, 25 also separates the user traffic information (actually voice signal) from the ATM cell, decodes the user traffic information according to a QCELP (Qualcomm Code-book Excited Linear Prediction) process, and transmits the decoded user traffic information to the mobile switching center 14. Each of the voice signal processors 24, 25 also reverses the above process.

When the OW processor 26 receives an ATM cell of AAL Type 0, the OW processor 26 reads order wire service information carried by the payload of the received ATM cell. The OW processor 26 also reverses the above process.

When the monitor/controller 27 receives an ATM cell of AAL Type 5 transmitted from the controllers 19 of the base transceiver stations 11, 12, the monitor/controller 27 reads BTS monitoring control information carried by the payload of the received ATM cell, and carries out a monitoring process based on the monitoring information contained in the BTS monitoring control information. The monitor/controller 27 also adds control information as BTS monitoring control information to an ATM cell of AAL Type 5, and transmits the ATM cell of AAL Type 5 through the ATM SW unit 23 and the BTS interface 21 to either one of the controllers 19 of the base transceiver stations 11, 12. Furthermore, when the monitor/controller 27 receives an ATM cell of AAL Type 5 transmitted from the voice signal processors 24, 25, the monitor/controller 27 reads signaling information carried by the payload of the received ATM cell, and effects a signaling process on the voice signal processors 24, 25.

Figure 3:
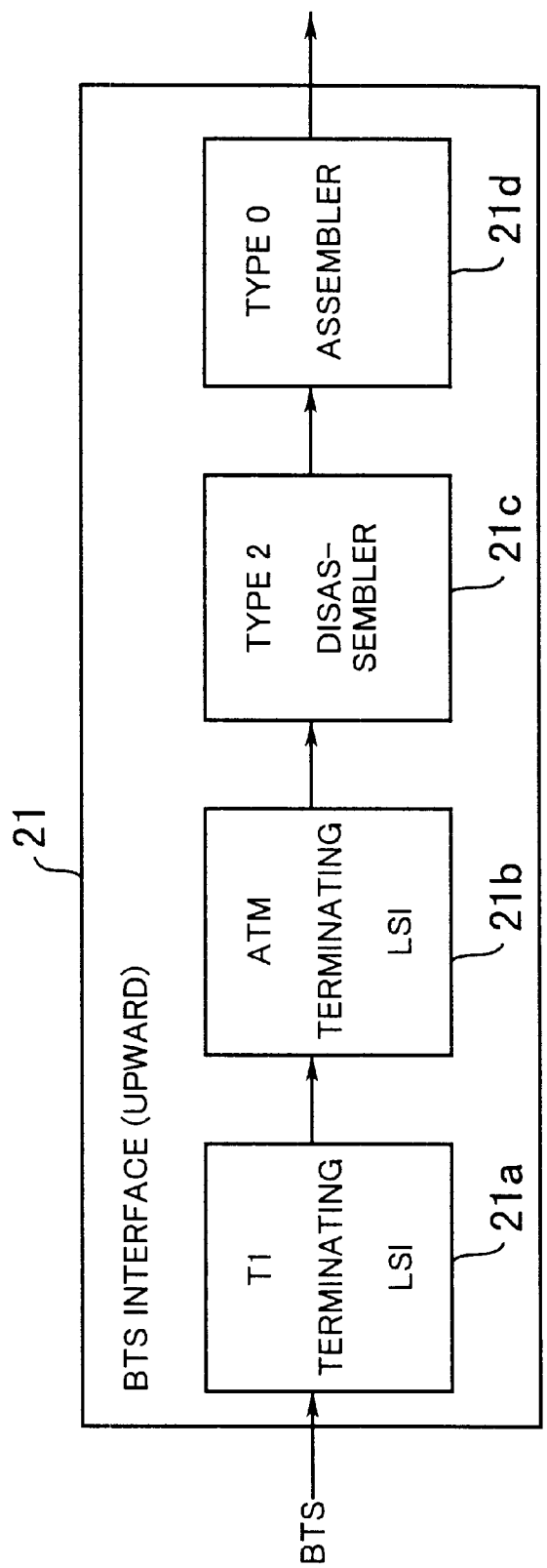
FIG. 3 is a block diagram of an upward processing section of a BTS interface of the base-station host system.

FIG. 3 shows in block form an upward processing section of each of the BTS interfaces 21, 22 of the base-station host system 13. Since the BTS interfaces 21, 22 are structurally identical to each other, the structure of the upward processing section of the BTS interface 21 will be described below.

The upward processing section of the BTS interface 21 comprises a T1 terminating LSI 21a, an ATM terminating LSI 21b, a Type 2 disassembler 21c, and a Type 0 assembler 21d. The T1 terminating LSI 21a is supplied with an ATM cell of AAL Type 2 or AAL Type 5 which has been mapped onto a T1 frame. The terminating LSI 21a electrically terminates a T1 interface, extracts a clock signal, establishes T1 frame synchronization, and detects an alarm on the T1 frame. The ATM terminating LSI 21b extracts an ATM cell from the payload of the T1 frame, checks the extracted ATM cell for an HEC (Header Error Control) error, and filters the received cell according to a VPI/VCI value. The ATM terminating LSI 21b also distinguishes between ATM cells of AAL Type 2 and ATM cells of AAL Type 5, sends ATM cells of AAL Type 2 to the Type 2 disassembler 21c, and outputs ATM cells of AAL Type 5 to the ATM SW unit 23.

The Type 2 disassembler 21c carries out a preparatory process in preparation for dissembling a plurality of CPS packets contained in an ATM cell of AAL Type 2. Details of the Type 2 disassembler 21c will be described later on with reference to FIG. 5.

The Type 0 assembler 21d processes each CPS packet, and assembles an ATM cell of AAL Type 0 based on one CPS packet. Details of the Type 0 assembler 21d will be described later on with reference to FIG. 6.

FIGS. 4(A), 4(B), and 4(C) show the mutual relationship of an ATM cell of AAL Type 2, a CPS packet, and an ATM cell of AAL Type 0.

FIG. 4(A) shows the structure of an ATM cell of AAL Type 2. As shown in FIG. 4(A), the ATM cell of AAL Type 2 comprises a header of five bytes and a payload of 48 bytes. The payload includes an SF (Start Field) of one byte at its start and a plurality of CPS packets mapped thereonto after the start field. The start field comprises a 0th bit representing odd parity of the start field, a first bit representing an SN (Sequence Number) which is either "1" or "0", and second through seventh bits representing an OSF (Offset Field) that records a value indicative of the start position of the first CPS packet.

FIG. 4(B) shows the structure of a CPS packet. As shown in FIG. 4(B), the CPS packet comprises a header of three bytes and a variable-length payload. The header comprises a CID (Channel Identifier), an LI (Length Identifier) indicative of the length of the payload of its own packet, a PT (Payload Type) indicative of the type of the payload, a UUI (User-to-User Indication) for the transmission of information between users, and an HEC (Header Error Control) for detecting a header error, which are all mapped thereonto. The variable-length payload comprises user traffic information mapped thereonto.

FIG. 4(C) shows the structure of an ATM cell of AAL Type 0. As shown in FIG. 4(C), the ATM cell of AAL Type 0 comprises a header of five bytes and a payload of 48 bytes. The payload has, at its start, an effective data LIB (Length Indicator B) of one byte indicative of the length of its own user traffic information, and also includes user traffic information mapped thereonto after the LIB and a pad of all "0s" in the remainder of the payload.

Figure 5:
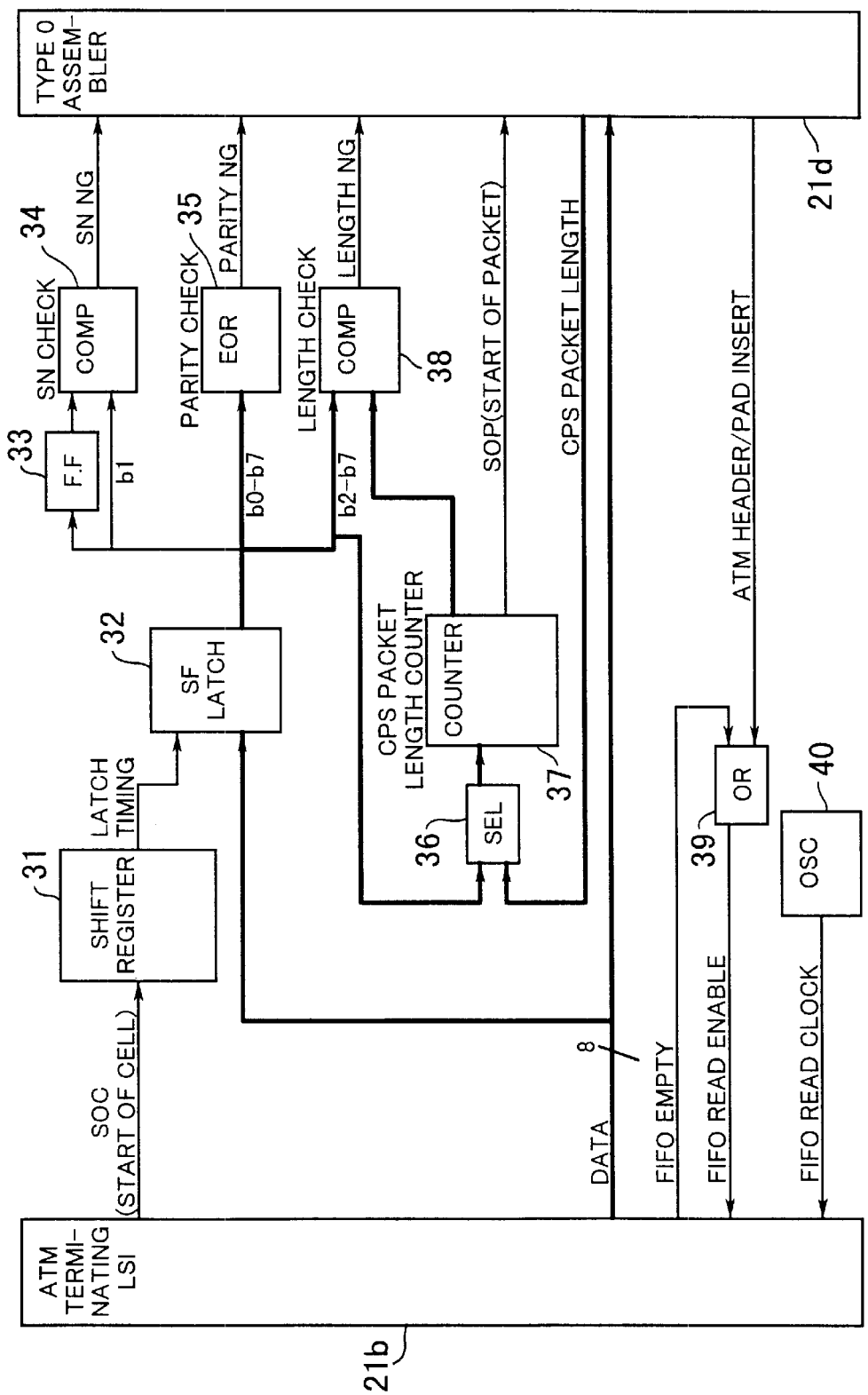
FIG. 5 is a block diagram of a Type 2 disassembler.

FIG. 5 shows in block form the internal structure of the Type 2 disassembler 21c. In the ATM terminating LSI 21b, an ATM cell of AAL type 2 is temporarily stored in a FIFO (First-In First-Out) memory. The stored ATM cell of AAL type 2 is read from the FIFO memory, and transmitted to the Type 0 assembler 21d and an SF latch 32. A shift register 31 is supplied with a timing signal of the start of the ATM cell, generates a latch timing signal with the first bit of a sixth byte, and sends the generated latch timing signal to the SF latch 32. In response to the latch timing signal, the SF latch 32 latches 1 byte of data of the start field of the ATM cell. A flip-flop (FF) 33 holds the previous value of the SN (Sequence Number) of the first bit. A comparator (COMP) 34 compares the previous value of the SN with the present value of the SN, and sends an SN error to the Type 0 assembler 21d if the compared values agree with each other.

An EOR (Exclusive-OR) gate 35 exclusive-ORs the first through seventh bits of the start field, and sends a parity error to the Type 0 assembler 21d if the result of the exlusive-ORing of the first through seventh bits is "0".

A comparator (COMP) 38 compares the OSF (Offset Field) value indicated by the second through seventh bits of the start field with an output value from a CPS packet length counter 37, and sends a length error to the Type 0 assembler 21d if the compared values do not agree with each other.

The CPS packet length counter 37 is initially set to the OSF value by a selector (SEL) 36, and thereafter set to the LI value of each CPS packet transmitted from the Type 0 assembler 21d. In either case, the CPS packet length counter 37 counts down the packet length. When the count reaches "0", the CPS packet length counter 37 outputs an SOP (Start Of Packet) signal indicative of the timing of the start of each CPS packet to the Type 0 assembler 21d.

An OR gate 39 generates a read enable signal for the FIFO memory based on empty information of the FIFO memory from the ATM terminating LSI 21b and a signal indicative of a time to insert a header and pad of an ATM cell from the Type 0 assembler 21d, and sends the generated read enable signal to the FIFO memory. When the FIFO memory is empty or a header and pad of an ATM cell is inserted by the Type 0 assembler 21d, the OR gate 39 inhibits reading of data from the FIFO memory. An OSC (OSCillator) 40 sends a read clock signal to the FIFO memory.

Figure 6:
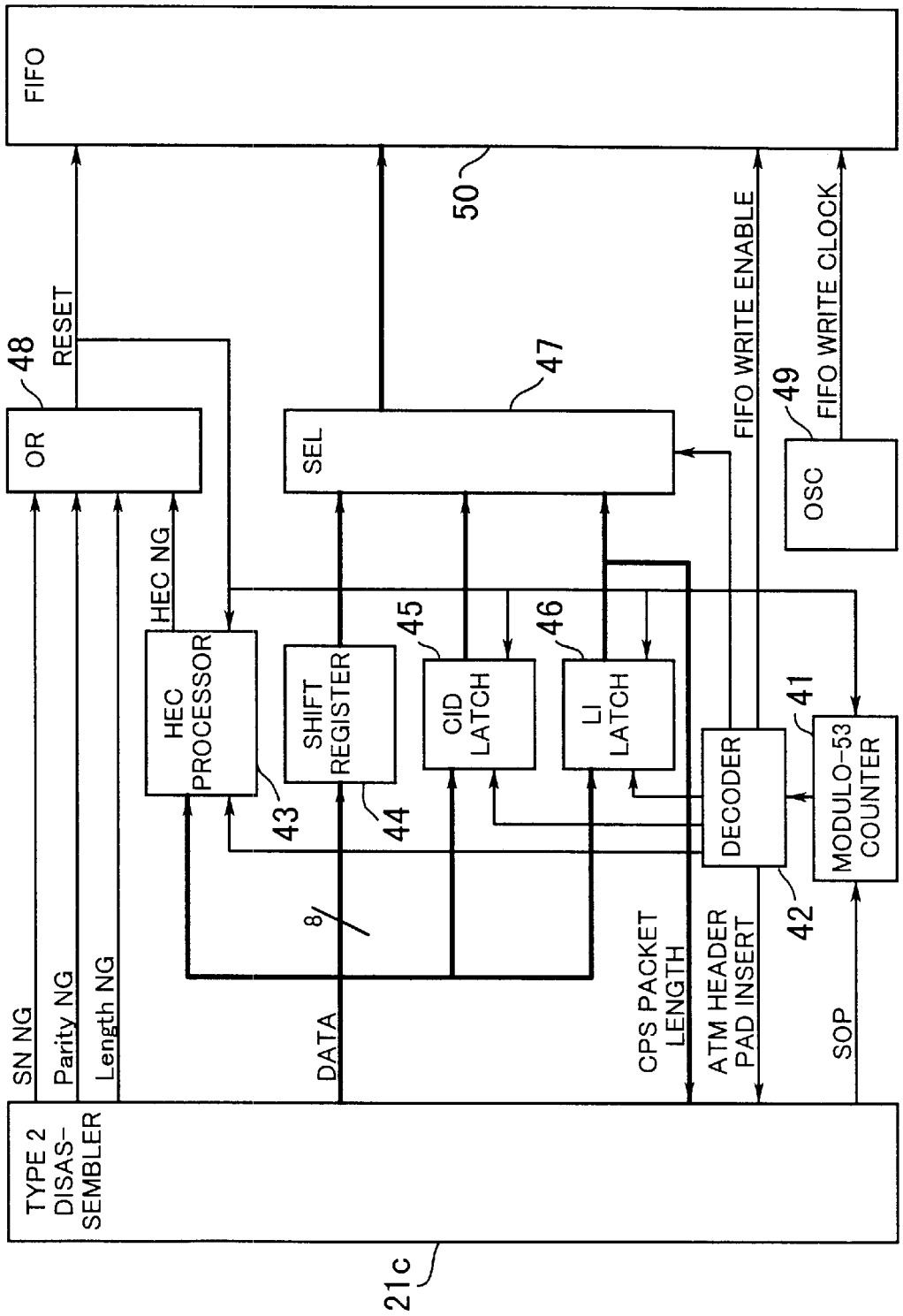
FIG. 6 is a block diagram of a Type 0 assembler.

FIG. 6 shows in block form the internal structure of the Type 0 assembler 21d.

As shown in FIG. 6, a modulo-53 counter 41 is energized in response to an SOP signal from the Type 2 disassembler 21c, and transmits an output signal to a decoder 42. Based on the output signal from the modulo-53 counter 41, the decoder 42 generates signals indicative of respective times to latch CID, LI, and HEC values of a CPS packet, and sends the generated signals respectively to a CID latch 45, an LI latch 46, and a HEC processor 43. The decoder 42 also generates a write enable signal and sends the write enable signal to an FIFO memory 50. The decoder 42 also sends a timing signal to a selector (SEL) 47. Depending on the timing signal sent from the decoder 42, the selector 47 selects one of the CID value sent from the CID latch 45, the LI value sent from the LI latch 46, and user traffic information sent from a shift register 44, maps the selected value or information onto a 53-byte ATM cell, and stores the ATM cell in the FIFO memory 50. Specifically, the CID value is recorded in eight low-order bits of a VCI field in the header of the ATM cell, and the LI value is recorded in an LIB field in the payload of the ATM cell.

The HEC processor 43 checks the header of the CPS packet for an error, and, sends an HEC error to an OR gate 48 if it detects an error. When the OR gate 48 is supplied with either one of an HEC error, an SN error, a parity error, and a length error, the OR gate 48 sends a reset signal to the FIFO memory 50, the HEC processor 43, the CID latch 45, the LI latch 46, and the modulo-53 counter 41 for thereby resetting them. An OSC 49 sends a write clock signal to the FIFO memory 50.

Figure 7:
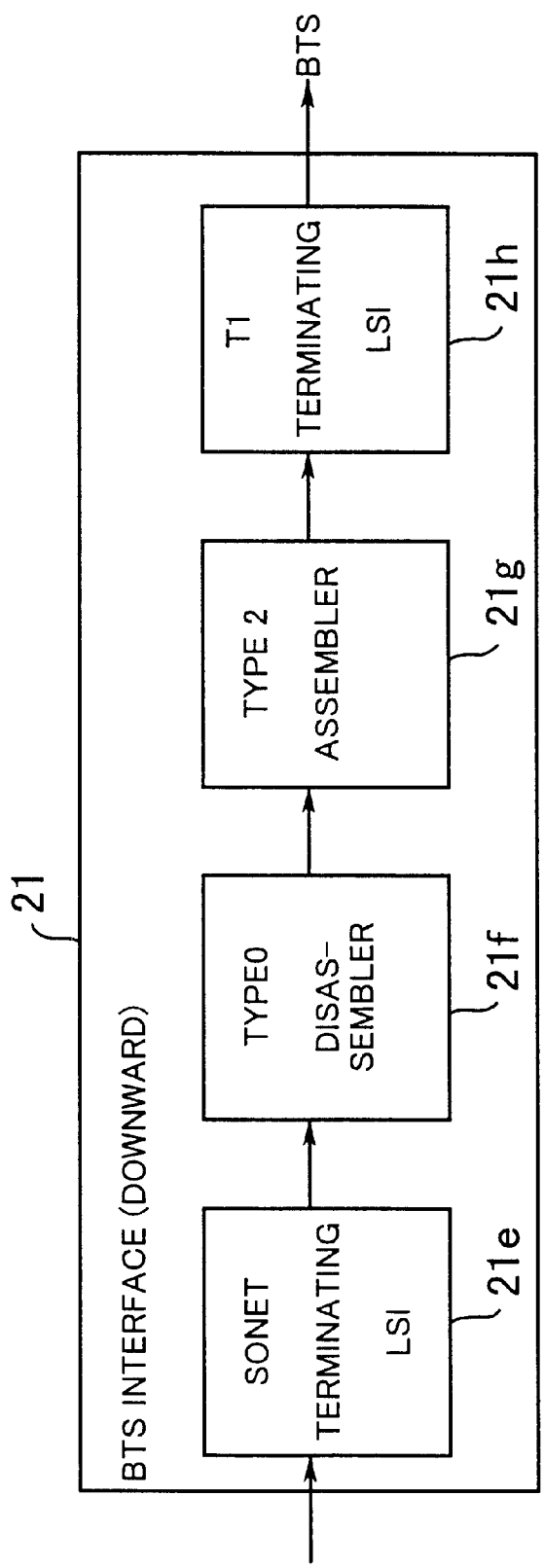
FIG. 7 is a block diagram of a downward processing section of the BTS interface of the base-station host system.

FIG. 7 shows in block form a downward processing section of each of the BTS interfaces 21, 22 of the base-station host system 13. Since the BTS interfaces 21, 22 are structurally identical to each other, the structure of the downward processing section of the BTS interface 21 will be described below.

The downward processing section of the BTS interface 21 comprises SONET (Synchronous Optical Network) terminating LSI 21e, a Type 0 disassembler 21f, a Type 2 assembler 21g, and a T1 terminating LSI 21h. The SONET terminating LSI 21e is supplied with an ATM cell of AAL Type 0 from the ATM SW unit 23. The SONET terminating LSI 21e terminates a SONET, extracts a clock signal, extracts an alarm signal, and extracts an ATM cell. The Type 0 disassembler 21f generates a CPS packet based on the ATM cell of AAL Type 0. The Type 2 assembler 21g collects a plurality of CPS packets, and generates an ATM cell of AAL type 2. The terminating LSI 21h maps the generated ATM cell of AAL type 2 onto a T1 frame, and transmits the ATM cell of AAL type 2 to the base transceiver stations 11, 12. The terminating LSI 21h also maps an ATM cell of AAL Type 5 sent from the monitor/controller 27 onto a T1 frame, and transmits the ATM cell of AAL type 5 to the base transceiver stations 11, 12.

Figure 8:
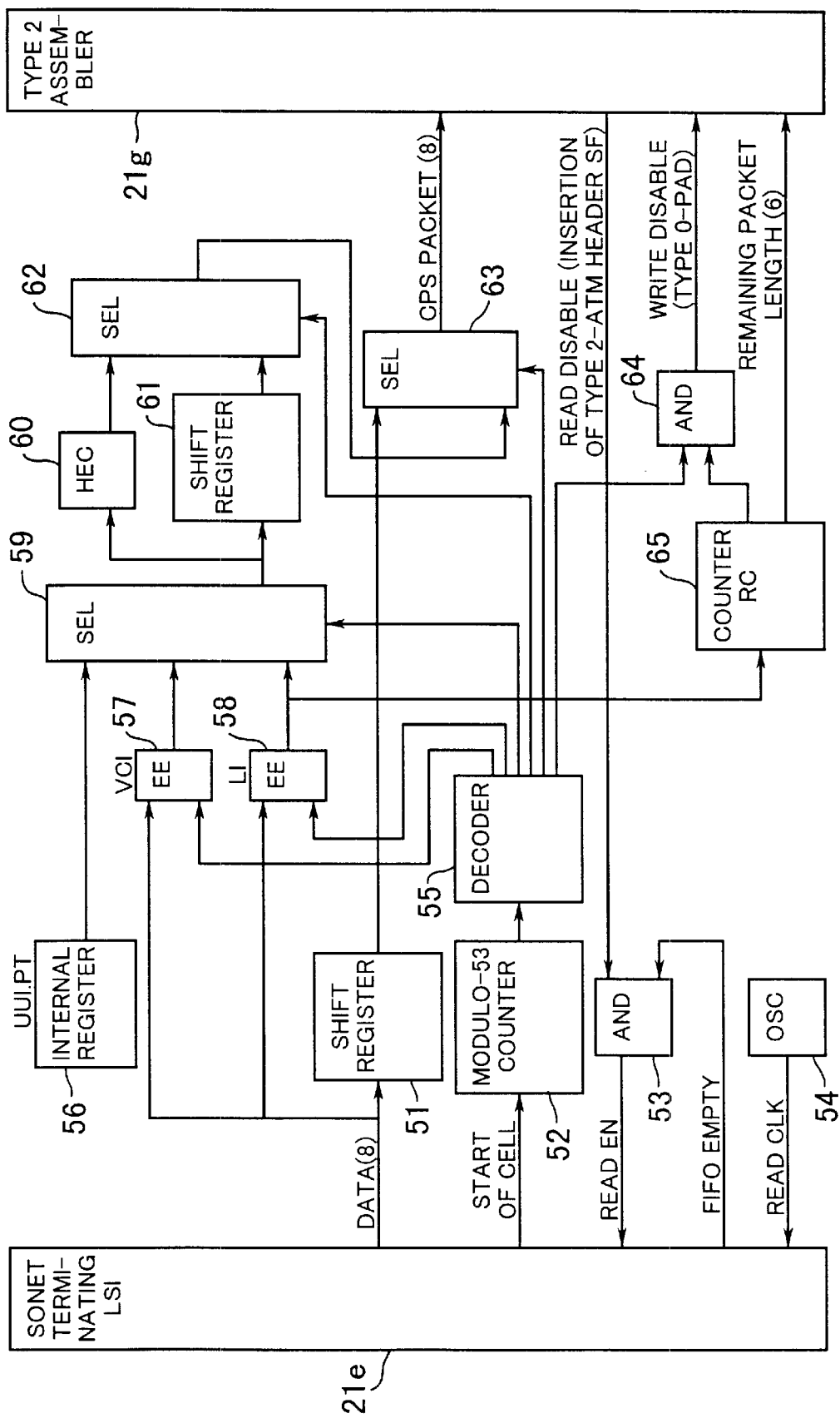
FIG. 8 is a block diagram of a Type 0 disassembler.

FIG. 8 shows in block form the internal structure of the Type 0 disassembler 21f.

As shown in FIG. 8, in the SONET terminating LSI 21e, an ATM cell of AAL type 0 is temporarily stored in a FIFO memory. The stored ATM cell of AAL type 0 is read from the FIFO memory. A modulo-53 counter 52 is energized in timed relation to the start of the ATM cell. Based on an output signal from the modulo-53 counter 52, a decoder 55 generates various timing signals and sends the generated timing signals to various circuits. A selector (SEL) 59 maps UUI information and PT information supplied from an internal register 56, eight low-order bits of a VCI transmitted from a flip-flop (FF) 57, and an LIB from a flip-flop (FF) 58 onto the respective fields UUI, PT, CID, LI of the header of a CPS packet. An HEC 60 generates and supplies a HEC value to a selector (SEL) 63, which maps the HEC value onto a HEC field of the header of a CPS packet. The selector 63 generates a CPS packet from the header, thus produced, and user traffic information from a shift register 51, and transmits the generated CPS packet to the Type 2 assembler 21g.

A counter 65 generates "remaining packet length" information of six bits based on the LI, and sends the generated "remaining packet length" information to the Type 2 assembler 21g. An AND gate 64 sends a write disable signal to the Type 2 assembler 21g while a pad is being inserted.

Figure 9:
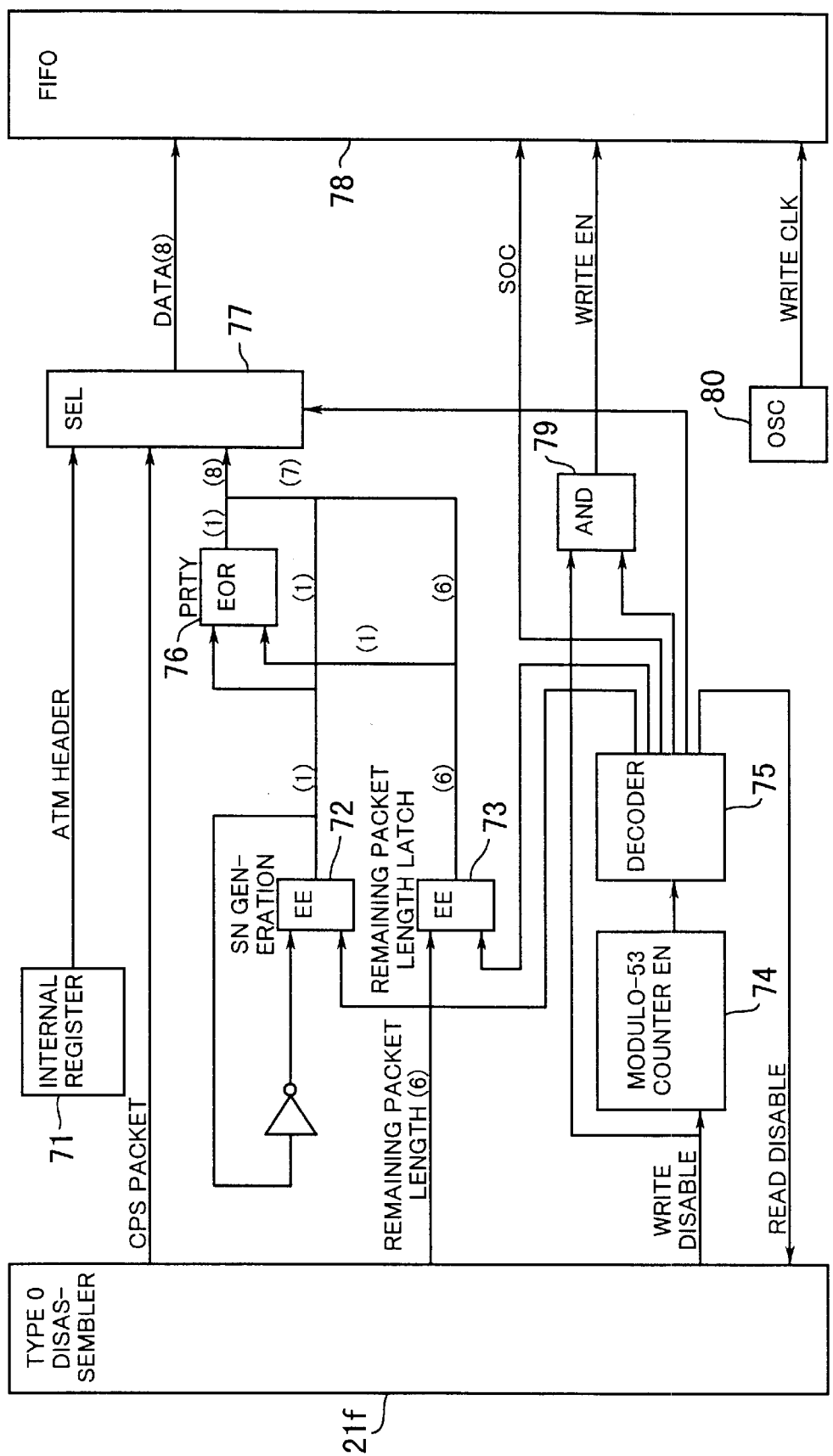
FIG. 9 is a block diagram of a Type 2 assembler.

FIG. 9 shows in block form the internal structure of the Type 2 assembler 21g.

As shown in FIG. 9, a modulo-53 counter 74 is energized in response to a write stop signal from the Type 2 disassembler 21c. Based on an output signal from the modulo-53 counter 74, a decoder 75 generates various timing signals and sends the generated timing signals to various circuits. A flip-flop (FF) 72 generates an SN value of one bit. A flip-flop (FF) 73 generates an OSF (Offset Field) value of 6 bits based on the "remaining packet length" information. An EOR gate 76 generates a parity value of one bit. These generated values are mapped thereby to generate a start field of eight bits. A selector (SEL) 77 maps an ATM cell header information from an internal register 71, a CPS packet from the Type 0 disassembler 21f, and the generated start field, generating an ATM cell of AAL Type 2, and sends the generated ATM cell of AAL Type 2 to an FIFO memory 78. The FIFO memory 78 stores the ATM cell according to a write permit enable signal from an AND gate 79.

According to the first embodiment, as shown in FIG. 2, each of the base transceiver stations 11, 12 has CDMA signal processors for effecting CDMA radio communications with mobile stations. Since signaling information is transmitted within user traffic information according to the CDMA process, the base-station host system 13 is required to separate the signaling information from the user traffic information somewhere therein. For reverse communications, the base-station host system 13 is required to insert signaling information into user traffic information somewhere therein.

According to the first embodiment, signaling information is separated and inserted by the voice signal processors 24, 25. Separation and insertion of signaling information with the voice signal processors 24, 25 is most efficient in view of the fact that the voice signal processors 24, 25 code and decode signaling user traffic information according to the QCELP process, the voice signal processors 24, 25 need to select one of items of user traffic information that are supplied from a plurality of base transceiver stations due to a soft hand-off process of the CDMA process, and one of items of signaling information also needs to be selected somewhere in the base-station host system 13.

Specifically, separation and insertion of signaling information with the voice signal processors 24, 25 requires a less amount of hardware than with other circuits in the base-station host system 13, and greatly reduces a burden on the monitor/controller 27 because the signaling information is supplied altogether to the monitor/controller 27. Because user traffic information and signaling information stay together until they reach the voice signal processors 24, 25, the amount of traffic in the base-station host system 13 may be relatively small.

Although the first embodiment is applied to CDMA radio communications, the principles of the present invention are not limited to CDMA radio communications, but are also applicable to other types of radio communications.

According to the first embodiment, order wire service information is transmitted by way of ATM cells over entrance links between the base transceiver stations 11, 12 and the base-station host system 13. Consequently, no dedicated lines are required, and hence no expenditure of expenses for such dedicated lines is needed. Use of ATM cells of AAL Type 2 over the entrance links makes it possible to efficiently transmit order wire service information without permanently occupying the entrance links and restricting the traffic. In the base-station host system 13, ATM cells of AAL Type 0 converted from ATM cells of AAL Type 2 are transmitted. Therefore, order wire service information can be routed with an ATM switch which can operate at a high speed and is not subject to a heavy processing burden. Since order wire service information can be processed by a processor for user traffic information and signaling information, the hardware requirement can be simplified.

According to the first embodiment, furthermore, BTS monitoring control information is transmitted using ATM cells of AAL type 5. Inasmuch as the BTS monitoring control information is generally a large amount of information that cannot be divided and is generated at all times, it does not lend itself to being transmitted using ATM cells of AAL type 2. For these reasons, the BTS monitoring control information is transmitted using ATM cells of AAL type 5.

A base-station host system according to a second embodiment of the present invention will be described below.

The base-station host system according to the second embodiment is basically of the same structure as the base-station host system according to the first embodiment. Therefore, details of the base-station host system according to the second embodiment which are identical to those of the base-station host system according to the first embodiment will not be described, and only different details of the base-station host system according to the second embodiment will be described below.

Figure 10:
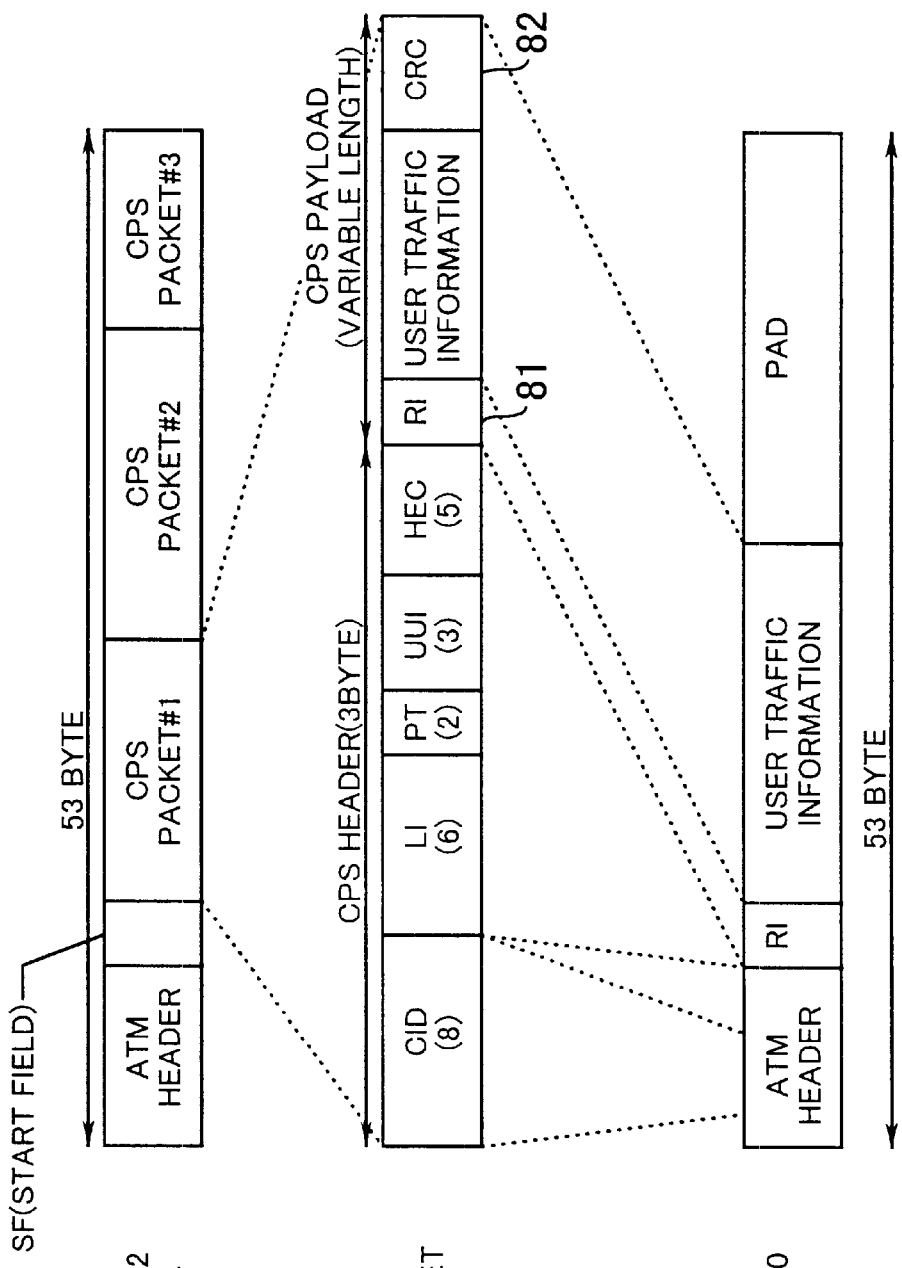
FIG. 10(A) is a diagram showing the structure of an ATM cell of AAL Type 2 in a base-station host system according to a second embodiment of the present invention.
FIG. 10(B) is a diagram showing the structure of a CPS packet in the base-station host system according to the second embodiment of the present invention.
FIG. 10(C) is a diagram showing the structure of an ATM cell of AAL Type 0 in the base-station host system according to the second embodiment of the present invention.
Figure 11:
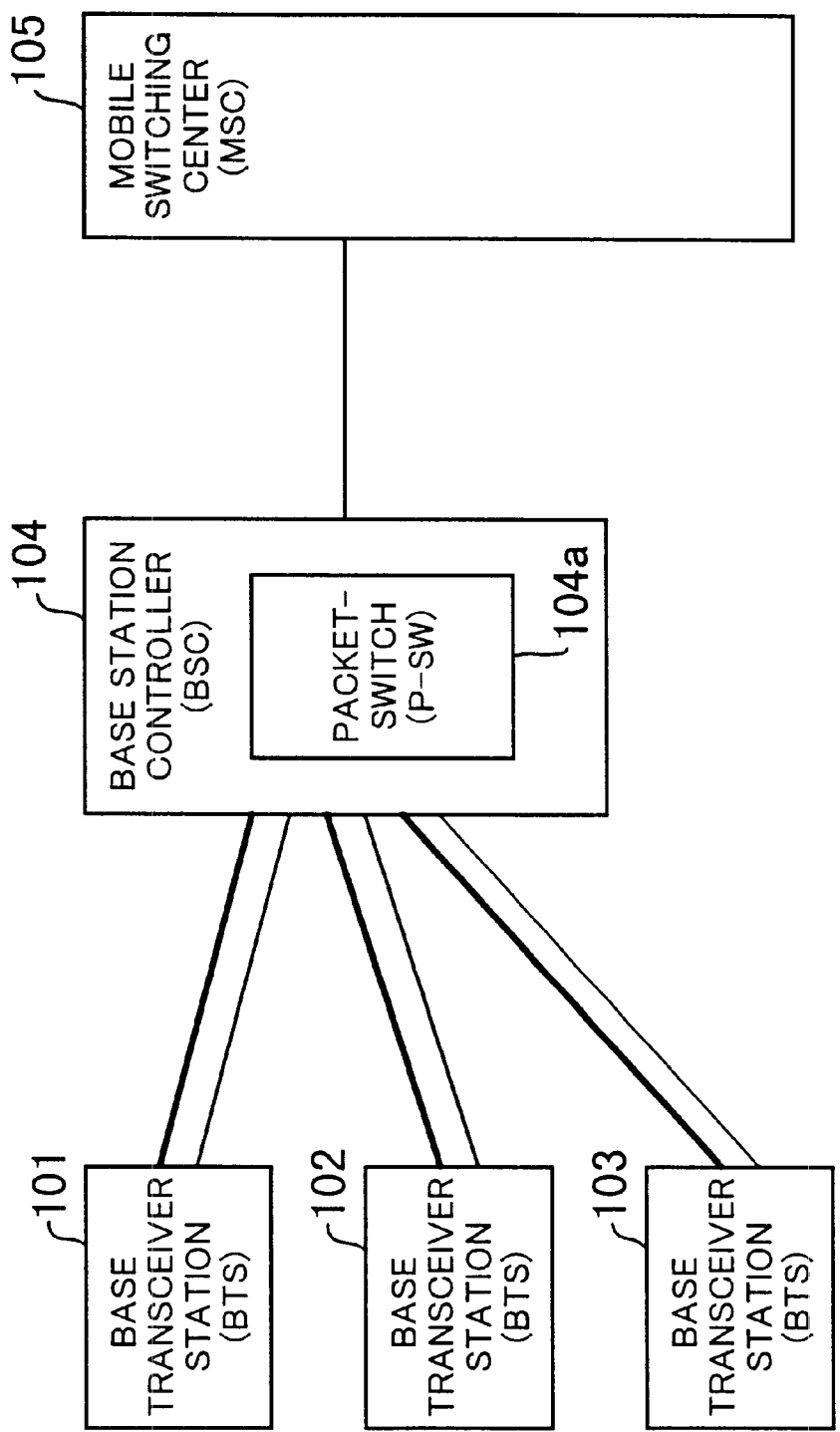
FIG. 11 is a block diagram of a mobile communication system to which ATM communications of AAL Type 2 are applied.

FIGS. 10(A), 10(B), and 10(C) show the mutual relationship of an ATM cell of AAL Type 2, a CPS packet, and an ATM cell of AAL Type 0 in the base-station host system according to the second embodiment.

FIG. 10(A) shows the structure of an ATM cell of AAL Type 2. The ATM cell of AAL Type 2 shown in FIG. 10(A) is identical to the ATM cell of AAL Type 2 shown in FIG. 4(A). FIG. 10(B) shows the structure of a CPS packet. As shown in FIG. 10(B), the CPS packet comprises a header of three bytes and a variable-length payload. The header is identical to the header of a CPS packet in the first embodiment shown in FIG. 4(A). The payload comprises user traffic information, rate information (RI) 81 mapped thereonto at the start of the payload and CRC (Cyclic Redundancy Check) information 82 mapped thereonto at the end of the payload. FIG. 10(C) shows the structure of an ATM cell of AAL Type 0. As shown in FIG. 10(C), the ATM cell of AAL Type 0 comprises a header of five bytes and a payload of 48 bytes. The header is identical to the header of an ATM cell in the first embodiment shown in FIG. 4(C). The payload has rate information 81 mapped thereonto at the start of the payload, user traffic information mapped thereonto after the rate information 81, and a pad of all "0s" in the remainder of the payload.

The rate information 81 is information indicative of a data rate (transmission rate or compression percentage). According to the CDMA process, a vocoder is employed on the QCELP process, and the vocoder codes and decodes data according to a data rate. Therefore, since the rate information 81 is transmitted, user traffic information can be read easily when it is to be decoded. When an ATM cell of AAL Type 0 is converted into an ATM cell of AAL Type 2, an effective data length except the pad in the ATM cell of AAL Type 0 can easily be determined.

The CRC information 82 represents an error detecting code for detecting an error in the rate information 81 and user traffic information in the payload of a CPS packet. With the CRC information 82 mapped onto the CPS packet, it is possible to check and correct errors in the user traffic information and rate information 81 in the payload of the CPS packet.

The mapping of the CRC information 82 is highly effective because signaling information that is not allowed to have even an error of single bit is combined with user traffic information according to the CDMA process.

In the second embodiment, the rate information 81 and the CRC information 82 are mapped onto the payload of the CPS packet. However, one of the rate information 81 and the CRC information 82 may be mapped onto the payload of the CPS packet.

According to the present invention, as described above, when the base-station host system receives a cell containing a plurality of packets (an ATM cell of AAL Type 2), the base-station host system separates the packets contained by the cell, converts them into an internally processable cell (an ATM cell of AAL Type 0), and routes the internally processable cell with the ATM switch. Therefore, the cell can be routed at a high speed with a reduced burden on the routing process.

The base-station host system effects a conversion between a CID field value of a CPS packet and a VPI/VCI in an ATM cell of AAL Type 0. Consequently, routing for each user can be effected with only the ATM layer without involving an ATM adaptation layer.

The base-station host system also effects a conversion between an LI field value of a CPS packet and effective data information (LIB value) in an ATM cell of AAL Type 0. Consequently, effective data in a payload can easily be read by a circuit which has read an ATM cell of AAL Type 0.

In the CDMA process, rate information of user traffic information is mapped onto the payload of a CPS packet. This allows the voice signal processors of the base-station host system to extract user traffic information with ease.

CRC information is also mapped onto the payload of a CPS packet, so that user traffic information can be transferred accurately.

In the CDMA process, signaling information is separated from user traffic information and signaling information is inserted into user traffic information by the voice signal processors of the base-station host system. In this manner, the base-station host system is subject to a reduced burden for a signaling process in a soft hand-off process.

Order wire service information is transmitted using ATM cells over the entrance links. Therefore, dedicated lines are not required, and the cost of the base-station host system is reduced.

Furthermore, order wire service information is transmitted using ATM cells of AAL Type 2. Therefore, a processor which processes user traffic information that is also transmitted using ATM cells of AAL Type 2 can be used to process order wire service information. As a consequence, the cost of the base-station host system is reduced, and the processing of order wire service information is simplified.

In addition, BTS monitoring control information is transmitted by way of ATM cells. No dedicated line for controlling the base-station host system is required, and the cost of the base-station host system is reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A host system for controlling a base station to transmit a signal to and receive a signal from the base station by way of a cell containing a plurality of packets representing signals from the base station to a plurality of base stations or from a plurality of base stations to the base station, comprising:

packet extracting means for extracting a plurality of individual packets contained in a cell;

cell generating means for generating an internally processable cell based on the individual packets extracted by said packet extracting means;

switching means for switching internally processable cells generated by said cell generating means depending on routes thereof;

packet generating means for generating packets based on an internally processable cell destined for a base station; and cell transmitting means for generating a cell containing a plurality of packets destined to the same base station from the packets which are generated by said packet generating means and transmitting the generated cell to the base station, wherein each of the individual packets extracted by said packet extracting means includes a payload carrying at least user traffic information, and the internally processable cell based on which the packets are generated by said packet generating means includes a payload carrying at least user traffic information and a cell containing a plurality of packets transmitted from the base station represents a signal processed according to a CDMA process, and the payload of each of the packets contained in the cell includes rate information indicative of a data rate of the user traffic information, and wherein said cell generating means comprises means for generating the internally processable cell based on information including the rate information.

2. A host system according to claim 1, wherein said cell generating means comprises:

VPI/VCI value generating means for generating a VPI/VCI value of each of the internally processable cells based on a CID field value in the header of each of the packets extracted by said packet extracting means; and wherein said packet generating means comprises:

CID field value generating means for generating a CID field value for a packet based on a VPI/VCI value in the header of the internally processable cell destined for the base station.

3. A host system according to claim 1, wherein said cell generating means comprises:

effective data length adding means for extracting an LI field in the header of each of the packets extracted by said packet extracting means, and adding the extracted LI field as effective data length information to the payload of each of the internally processable cells; and wherein said packet generating means comprises:

LI field value adding means for extracting effective data length information in the payload of the internally processable cell destined for the base station, and adding the extracted effective data length information to an LI field in the header of a packet.

4. A host system according to claim 1, wherein the payload of a CPS packet contained in the cell includes a CRC information.

5. A host system according to claim 1, wherein a cell containing a plurality of packets transmitted from the base station represents a signal processed according to a CDMA process, further comprising:

separating means for receiving the internally processable cell generated by said cell generating means via said switching means, and separating user traffic information and signaling information from information carried by the payload of the received internally processable cell; and transmitting means for inserting the signaling information into the user traffic information, adding the signaling information and the user traffic information to the payload of an internally processable cell, and transmitting the internally processable cell via said switching means to said packet generating means.

6. A host system according to claim 1, wherein order wire service information is carried by the payload of each of the packets extracted by said packet extracting means, and order wire service information is carried by the payload of the internally processable cell based on which the packets are generated by said packet generating means.

* * * * *